United States Patent Office 3,647,726
Patented Mar. 7, 1972

3,647,726
FLUID POWDER COATING COMPOSITION
William W. Ulmer, Muskegon, Mich., assignor to Anaconda Wire and Cable Company, New York, N.Y.
No Drawing. Filed Jan. 2, 1969, Ser. No. 788,631
Int. Cl. C08g 30/12, 30/14, 45/04
U.S. Cl. 260—18 EP
29 Claims

ABSTRACT OF THE DISCLOSURE

An epoxy fluid coating powder suitable for coating electrical conductors in a fluidized bed or an electrostatic fluid bed is prepared by mixing two solid diglycidyl ether bisphenol A resins of which the first has an epoxy equivalent weight of 825 to 1025 and a Durran's melting point of 93° to 105° C. and the second has an epoxy equivalent weight of about 1550 to 2500 and a Durran's melting point of 113° to 135° C. The resinous mixture contains about 80% to 90% weight of the first epoxy resin and a 10% to 20% by weight of the second epoxy resin. The resinous composition is mixed with 8 to 12.5 parts per 100 parts resins by weight (phr.) of trimellitic anhydride and about .11 to about .46 phr. of an activator, such as hexamethylene tetramine. The resultant coating from these powder mixtures has high flexibility, which is capable of passing a 180° edgewise bend with smoothness of the coating and has a thermoplastic flow of higher than 240° C. The resultant electrical conductor with a 2 mil coating can withstand more than 300 volts with less than 50 breaks per 100 feet.

BACKGROUND OF THE INVENTION (I) Field of the invention

This invention relates to an epoxy coating powder composition particularly suitable for coating electrical conductors and the like in a fluidized bed or an electrostatic fluid coating apparatus. It also relates to a method for coating conductors and the like and the resultant product.

(II) Description of the prior art

Epoxy resin has been used as the electrical insulation for magnet wires. A variety of coating techniques is being used to provide a thin and continuous film on the electrical conductor, of which one of the more recently developed methods involved fluid coating of the wire with an extremely fine epoxy powder. The fluid coating method generally uses a fluidized bed, or more advantageously, an electrostatic fluid bed in which the conductor is coated with a thin coating of powder. The wire thus coated is then heated to the fusion temperature of the wire and cured thereonto.

In order to render the fluid coating technique attractive and economically competitive to the more conventional wet coating techniques, the curing of the resultant epoxy powder must be relatively fast. Heretofore, the use of a curing agent or catalyst to cure the epoxy resin coating sufficiently fast would usually produce a brittle coating not suitable for magnet wire applications. In order to satisfy the flexibility requirement of the magnet wire, a slower curing system has been used. This type of curing system requires exceedingly long baking time of the coated wire for curing the epoxy powder.

SUMMARY OF THE INVENTION

I have now discovered that a fluid coating powder composition which can provide an epoxy resin coating on a conductor with excellent flexibility can be cured in a very short period. Broadly stated, the resinous powder composition of this invention comprises a mixture of at least one solid diglycidyl ether of bisphenol A resin having an epoxy equivalent weight between about 800 to about 2500 and a Durran's melting point between about 93° to about 135° C., 8 to 12.5 phr. of trimellitic anhydride and about .1 to .5 phr. of an activator.

Advantageously, the powder composition of this invention is applied onto a conductor in a fluidized bed or an electrostatic fluid bed to provide a thin coating thereon and thereafter the coated conductor is heated to a temperature sufficiently high and for a period sufficient to fuse and to cure the coating thereonto. The coating on the resultant wire has excellent flexibility which is capable of passing a 180° edgewise bend with smoothness of the coating. The coating also has a thermoplastic flow of higher than 240° C. In general, a magnet wire with a 2 mil coating can withstand 300 volts with no more than 50 breaks per 100 feet.

DESCRIPTION OF THE PREFERRED EMBODIMENTS

The epoxy resins suitable for the composition of this invention are the solid diglycidyl ethers of 2,2-bis(4-hydroxyphenyl)propane, said propane being commonly known as "bisphenol A" having an epoxy equivalent weight in the range between 800 to about 2500 and a Durran's melting point between about 93° to about 135° C. Epoxy resins of this type are available commercially under a variety of trade names.

In practice, I prefer to use two epoxy resins of which the first has an epoxy equivalent weight near or at the lower and the second near or at the upper range stated above. By mixing the two epoxy resins, various film characteristics of the resultant coating can then be obtained. The commercial epoxy resins with the lower and the higher epoxy equivalent weight that I found to be particularly suitable are listed below in Tables I and II respectively.

TABLE I

| Company and identification No. | Epoxy equivalent weight | Durran's melting point, °C. |
|---|---|---|
| Ciba "Araldite 6084" | 825–1,025 | 95–105 |
| Dow "DER 664" | 875–975 | 95–105 |
| Jones-Dabney "Epi-Rez 530-C" | 860–1,015 | 95–105 |
| General Mills "925 solid resin" | | |
| Richold Chemical "Epotuf 37-304" | 875–1,000 | 93–104 |
| Shell "Epon 1004" | 875–1,025 | 95–105 |
| Union Carbide "EKR-2003" | 875–975 | 93–104 |

TABLE II

| Company and identification No. | Epoxy equivalent weight | Durran's melting point, °C |
|---|---|---|
| Ciba "Araldite 7097" | 1,650–2,000 | 113–123 |
| Dow Chemical "DER 667" | 1,600–2,000 | |
| Jones-Dabney "Epi-Rez 540-C" | 1,600–2,000 | 127–133 |
| General Mills "Genepoxy 1800" | | |
| Richold "Epotuf 37–307" | 1,550–2,000 | 114–124 |
| Shell "Epon 1007" | 2,000–2,500 | 125–135 |

The ratio of the low to the high epoxy equivalent weight resins can vary within a wide range, i.e., from 100% low to 100% high epoxy equivalent weight resin. However, for magnet wire applications I found a ratio of low to high in the range of 4 to 9 provides the best results. A typical resinous mixture should contain 10% to 20% by weight of the high epoxy equivalent weight resin and 80% to 90% by weight of the low epoxy equivalent weight resin.

The curing agent for the epoxy resin or resinous mixture is trimelliticanhydride (TMA)

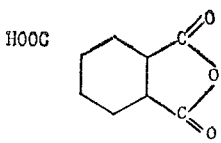

This compound is a white powder with a molecular weight of 192 and a melting point of 168° C. The amount of TMA that can be used depends upon the hydroxyl equivalent to cross-link. However, the amount used should not be in excess of 12.5 phr., if proper film characteristics are to be obtained. For magnet wire application the amount of TMA that may be used is in the range between about 8 to about 12.5 phr.

To promote proper curing of the epoxy resin, an activator or a "kicker" should be used. The activators that can be used are the amines, among which I found monoethylamine, BF₃MEA and more particularly hexamethylene tetramine to be suitable. The amount of activator that can be used is in the range between about .1 to .5 phr.

Since all the ingredients for the resin composition of this invention are solid, the composition can be conveniently prepared by merely mixing the ingredients and finely grinding the resultant mixture to the desired fineness. For magnet wire application, the powder should be ground to −170 mesh and preferably −200 mesh. A typical screen analysis of resin powder of this invention is as follows:

| Mesh: | Percent |
|---|---|
| +170 | 2.74 |
| +200 | 12.50 |
| +230 | 10.90 |
| +270 | 10.50 |
| +325 | 5.26 |
| +400 | 9.70 |
| −400 | 48.50 |

The above screen analysis indicates that 48.5% of the powder is 26 microns or less in size.

The resultant powder may be applied on the conductor using conventional fluidized bed or electrostatic fluid bed coating techniques. For large conductors, direct application of the powder on the conductors can be used. For manufacturing magnet wires, I prefer to use an electrostatic coating machine described in United States Pat. No. 3,396,699 issued to Beebe et al. on Aug. 13, 1968.

Further to illustrate this invention specific examples are set forth below. In these examples electrostatic equipment described in the patent referred to hereinabove was used. The oven for the equipment was about 9 feet long equipped with infra-red energy lamps.

EXAMPLE I

The following materials were mixed and finely ground:

| | Percent by weight |
|---|---|
| Epi-Rez | 85.6 |
| Hexamethylene tetramine | 0.24 |
| Trimellitic anhydride | 8.56 |
| Titanium dioxide | 3.51 |
| Cab-O-Sil | 2.11 |

Titanium dioxide was used as a high dielectric constant pigment for the coating which increases the electric charge of the powder composition. Cab-O-Sil, supplied by Godfrey L. Cabot, Inc., is colloidal pyrogenic silica pigment in fluffy powder form and was used herein as a flow control agent. Generally, up to about 11 phr. of flow control agent may be used. The preferred range is from 0.1 to 5 phr.

After the above powder was charged in the electrostatic chamber it was fluidized in the manner as described by the patent. A 0.031″ x 0.235″ rectangular copper wire passed through the chamber at a speed in the range of 40 to 64 feet per minute (f.p.m.) using an electrostatic potential of 100 kv. The wall thickness of the coating was 1.2 mils. The wire after it passed through the oven was cool and examined. It was noted that the wire was extremely smooth and it took an 180° edgewise bend with no crack. The average dielectric was 389 volts. At 39.5% elongation there was no lift, no bare copper and very few cracks on the edges.

The thermoplastic flow of the wire was 217° C. and the melt index was 98–102° C. The wire passed heat shock at 150° C. for one hour and also passed standard magnet wire solvent tests.

In the same experiment using a larger rectangular wire (0.065″ x 0.321″) with a coating speed slowed to the range of 30–35 f.p.m., a similar smooth wire was obtained which also passed a 180° edgewise bend and solvent tests. The dielectric of the wire was 644 volts for a 1.2 mils coating. The dielectric breakdown voltage was made using a foil electrode wrapped around the wire over the film and applying voltage to the foil with the copper wire ground.

EXAMPLE II

The following powder was prepared:

| | Percent by weight |
|---|---|
| Epi-Rez 530C | 80.17 |
| Epi-Rez 540C | 8.90 |
| Hexamethylene tetramine | 0.22 |
| Cab-O-Sil | 1.78 |
| Trimellitic anhydride | 8.93 |

Rectangular copper wires measured 0.31″ x 0.235″ and 0.065″ x 0.321″ were coated in a similar manner as described above. The coating speed was varied to provide different coating thicknesses. Using 100,000 volts of electrostatic potential, a 1.5 mils build was obtained for the smaller wire at a coating speed of 30 f.p.m. All the coated wire in this example had smooth coating and passed a 180° edgewise bend and solvent tests. For the smaller copper wires, 1.5 mils coating had a dielectric of 460 volts and the 4–5 mils had 1160 volts average. The thermoplastic flow was 225° C. (The thermoplastic flow increased to 300° C. when the coating speed was lowered to 25 f.p.m.) For the larger wire, the 1.5 mil coating had a dielectric of 530 volts average.

EXAMPLE III

The following powder was prepared:

| | Percent by weight |
|---|---|
| Epi-Rez 530C | 80.17 |
| Epi-Rez 540C | 5.50 |
| Hexamethylene tetramine | 0.24 |
| Cab-O-Sil | 2.11 |
| Trimellitic anhydride | 8.56 |
| Titanium dioxide | 3.51 |

A rectangular 0.065" x 0.321" copper wire was coated at 27 f.p.m. using 50,000 volts. The build was 2 mils and the average dielectric was 337 volts. At a lower coating speed the build reached 3–4 mils and the dielectric 600 volts. All the coating was smooth, passed a 180° edgewise bend and standard solvent and shock tests.

EXAMPLE IV

The flow out characteristic of the fluid coating powder of this invention can be materially improved by premelting the epoxy resins with an epoxy reactive diluent. One of such diluents which we found to be particularly suitable is Cardura E ester of Shell Chemical Company. This epoxy diluent has an epoxy equivalent weight of 240–250 and a viscosity at 25° C. of 7–8 centipoises and Cardura E is a glycidyl ester of Versatic 911 acid (a saturated synthetic tertiary monocarboxylic acid having $C_9$, $C_{10}$ and $C_{11}$ chain length). The melt after solidification by cooling is ground to the fine size before mixing with the curing agent.

The Cardura E treated epoxy resinous composition is particularly suitable for coating small round wires such as #15 aluminum and #10 copper wires were increased flow out provides a better coating. To illustrate the flow out characteristic of the coating powder the following two powder compositions were prepared:

EXAMPLE IV-A

| | Percent by weight |
|---|---|
| Epi-Rez 530C | 68.0 |
| Epi-Rez 540C | 17.3 |
| TMA | 12.5 |
| TMX 330 | 2.0 |
| Hexamethylene tetramine | 0.1 |
| Cab-O-Sil | 0.1 |

EXAMPLE IV-B

| | Percent by weight |
|---|---|
| Epi-Rez 530C | 70.0 |
| Epi-Rez 540C | 16.9 |
| Cardura "E" | 3.0 |
| Trimellitic anhydride | 10.0 |
| Hexamethylene tetramine | 0.1 |

AWG #10 round copper wires were coated with these two powders in a coating operation similar to the one described in Example I. The following results were obtained:

| | IV-A | IV-B |
|---|---|---|
| Gel time at 230° C. (sec.) | 55 | 62 |
| Cure at 230° C. (sec) | 90 | 125 |
| Flow at 60° angle | (¹) | (²) |

¹ 1 min. to 250° C.. 1¼.
² 1 min. to 260° C.. 2¼.

Although the cure time of this powder is lengthened the increase in the flow out characteristic of 100% more than offsets this disadvantage. It was noted that a 3 to 4 mils coating is flexible and passes a 180° edgewise bend.

EXAMPLE V

The curing time of the epoxy powder of this invention can be greatly shortened by premelting the epoxy resin with stannous octoate and an alicyclic diepoxy carboxylate of the following formula:

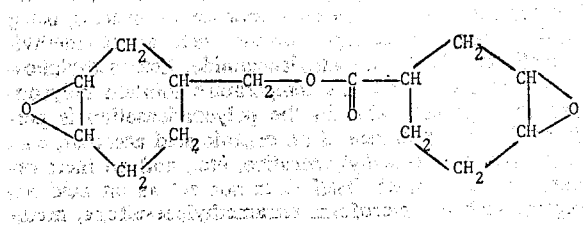

This compound is avilable commercially under the trade named Araldite Cy 179. The melt after solidification is regranulated before mixing with the curing system to form the powder composition of this invention. Using this fast curing powder the normal speed can be also doubled. The following two compositions were used to illustrate the difference in cure times.

EXAMPLE V-A

| | | |
|---|---|---|
| Epi-Rez 530C | Percent by weight | 70.0 |
| Epi-Rez 540C | do | 19.9 |
| Trimellitic anhydride | do | 10.0 |
| Hexamethylene tetramine | do | 0.1 |
| Gel time at 230° C. | sec | 31 |
| Cure time at 230° C. | sec | 75 |

EXAMPLE V-B

| | Percent by weight |
|---|---|
| Epi-Rez 530C | 60.0 |
| Epi-Rez 540C | 18.0 |
| Araldite Cy 179 | 10.0 |
| Stannous octoate | 2.0 |

After premelting together, the mixture was resolidified and regranulated by crushing. To the granulated mixture the following compound was added:

$$\text{trimellitic anhydride} \frac{\text{percent by weight}}{10.0}$$

The gel time at 230° C. for this powder composition on a conductor was 14 seconds and the cure time at 230° C. was 43 seconds.

EXAMPLE VI

The flow out of the powder composition of this invention also can be improved by premelting the epoxy resin with 1% to 5% by weight of a plasticizer such as dibutylphthalate, dioctylphthalate and dibutylsebacate. The melt is then resolidified and crushed before mixing with the curing agent. The following are two typical formulas and the result of wires coated with them.

EXAMPLE VI-A

| | |
|---|---|
| Epi-Rez 530C | 70.0% by weight. |
| Epi-Rez 540C | 19.9% by weight. |
| Dibutylphthalate | 1.0% by weight. |
| TMA | 10.0% by weight. |
| Hexamethylene tetramine | 0.1% by weight. |
| Gel time at 230° C. | 60 sec. |
| Cure time at 230° C. | 90 sec. |
| ⅛" bend flex. | O.K.—no crack. |
| Tight bend | O.K.—no crack. |
| Flow at 60° angle | 1 minute incline to 250° C. 1½". |

EXAMPLE VI-B

| | |
|---|---|
| Epi-Rez 530C | 65.0% by weight. |
| Epi-Rez 540C | 18.0% by weight. |
| Dibutylphthalate | 5.0% by weight. |
| TMA | 10.0% by weight. |
| Hexamethylene tetramine | 0.1% by weight. |
| Gel time at 230° C. | 85 sec. |
| Cure time at 230° C. | 170 sec. |
| ⅛" bend flex. | O.K.—no crack. |
| Tight bend | O.K.—no crack. |
| Flow at 60° angle | 1 minute incline to 250° C. 2³⁄₁₆". |

The powder compositions with the plasticizer can be applied on conductors with or without electrical charge. A modified procedure may use a vibrating screen to hold the powder and is placed over the preheated conductor to apply a thin coating thereon. The powder after melting starts to flow. A roller, spreader bar or scraper may then be used to smooth out the film. The coated conductor is then cured in the usual manner at 240° to 250° C. for 30 seconds. An experimental magnet wire with one coat prepared in this manner showed no shorts at 100 volts probe test, 400–600 volts NEMA tape test. Using two coats to a final build of 5–6 mils, the wire gave 2000 volts. The coating was flexible.

EXAMPLE VII

The gel and cure time of the powder composition of this invention also can be improved by using 1% to 10% phr. of a mixture of glycerol tristrimellitate and TMA as a fast reactant catalyst to start the TMA. A particular mixture of glycerol tristrimellitate that I found to be most effective is Cyclan 330 which is produced by Interchemical Corporation of Carlstadt, N.J. The mixture has a softening point of 40–60° C. and a flow point of 80–100° C. Due to the mixture's low melting point it starts crosslinking at 350° F. (TMA melts at 160° C.). A typical composition and the results of the coating on 0.064" x 0.121" aluminum rectangular wire are as follows:

| | Percent by weight |
|---|---|
| Epi-Rez 530C | 41.9 |
| Epi-Rez 540C | 41.9 |
| Epi-Rez 560C, a finely ground epoxy resin having an epoxy equivalent weight of 4000–6000 and a Durran's melting point of 165°–180° C. | 2.0 |
| Hexamethylene tetramine | 0.4 |
| TMA | 10.3 |
| Cyclan 330 | 2.0 |
| Cab-O-Sil | 1.5 |

The preheated conductor was coated at 50 kv. at the speed of 40 f.p.m. to provide 4.5–6.0 mils in two coats. The coating thus obtained passed a standard 1x flex test.

| | |
|---|---|
| Dielectric | 3081 volts. |
| Wet sponge | 10 breaks/100 ft. |
| Bronze wool | 5 breaks/100 ft. |

Solvent resistance

| | |
|---|---|
| Shellacol | Slightly tacky—none removed by cheese cloth in 24 hours. |
| Toluol | O.K., no effect. |
| 5% $H_2SO_4$ | O.K., no effect. |
| 1% NaOH | O.K., no effect. |
| Xylol | O.K., no effect. |
| Acetone | Softened but not removed. |
| Gel time | 23 seconds at 230 C. |
| Oil test | O.K., LW06593. |

As a comparison, the following powder composition was coated in the same manner:

| | Percent by weight |
|---|---|
| Epi-Rez 530C | 43.25 |
| Epi-Rez 540C | 43.25 |
| Epi-Rez 560C | 2.2 |
| Hexamethylene tetramine | .4 |
| TMA | 10.4 |
| Cab-O-Sil | .6 |

The coating speed was reduced to 34 f.p.m. to provide at 3.0–4.0 mils build. The gel point at 230° C. was 32 seconds.

EXAMPLE VIII

The flow out chaarcteristics at high temperature of the powder composition of this invention can be improved by adding to the composition 1% to about 21% by weight of a copolymer of styrene and allyl alcohol having on each molecule an average of about 5.4 primary hydroxyl groups and about 12.4 styrene monomer residues.

This polyol is available commercially under the trade name RJ-100 and is produced by Monsanto Chemical Company. This polyol has a softening point of 95–105° C. and has excellent reactivity with trimellitic anhydride. Following are two typical compositions with this polyol and the results with these compositions.

Example VIII-A

| | Percent by weight |
|---|---|
| RJ-100 | 20.5 |
| Epi-Rez 530C | 57.3 |
| Epi-Rez 540C | 10.0 |
| Hexamethylene tetramine | .4 |
| Trimellitic anhydride | 10.4 |
| Cab-O-Sil | 1.5 |

1 coat—5.0 mils—smooth flow out. 1x flex O.K.
No preheat
437 volts average

Example VIII-B

| | Percent by weight |
|---|---|
| Epi-Rez 530C | 65.6 |
| Epi-Rez 540C | 16.4 |
| TMA | 12.5 |
| TMX 330 (glycerol tristrimellitate anhydride) | 2.0 |
| RJ-100 | 2.5 |
| Hexamethylene tetramine | .5 |
| Cab-O-Sil | .5 |

2 coats preheated on .128" x .3128" aluminum rectangular 29 f.p.m.
5 to 6 mil build—180° edgewise bend—O.K.
Average dielectric 1450 volts—very smooth coat
Solvent resistance—acetone softens film but the film is not removed in 24 hours
5% $H_2SO_4$—No effect—O.K. 9H
5% NaOH—No effect—O.K. 9H
Toluol—O.K., no effect 9H+
Shellacol (alcohol denatured) O.K., no effect 2B
VM&P Naphtha—O.K., no effect 9H+
Thermoplastic flow—on copper—280° C., 300° C.
Pencil hardness as received in laboratory 9H+
Elongation 36%
Flexibility and adhesion 15% elongation—all O.K.
Dielectric in oil—2477 volts average
Oil test—O.K.

I claim:
1. A resinous powder composition suitable for fluid coating of conductors and the like which comprises a mixture of a first solid diglycidyl ether of 2,2-bis(4-hydroxyphenyl)propane having an epoxy equivalent weight between about 825 to about 1025 and a Durran's melting point between about 93° C. to about 105° C., a second solid diglycidyl ether of 2,2-bis(4-hydroxyphenyl)propane having an epoxy equivalent weight between about 1550 to about 2500 and a Durran's melting point of 113° to 135° C., 8 to 12.5 phr. of trimellitic anhydride and about .11 to about .46 phr. of an amine activator.

2. A resinous powder composition according to claim 1 wherein the ratio by weight of the first resin to the second resin is in the range between about 4 and about 9.

3. A resinous powder composition suitable for fluid coating of conductors and the like which comprises a mixture of a first solid diglycidyl ether of 2,2-bis(4-hydroxyphenyl) propane having an epoxy equivalent weight between about 825 to about 1025 and a Durran's melting point between about 93° C. to about 105° C., a second solid diglycidyl ether of 2,2-bis(4-hydroxyphenyl) propane having an epoxy equivalent weight between about 1550 to about 2500 and a Durran's melting point of 113° C. to 135° C., 8 to 12.5 phr. of trimellitic anhydride and from about .11 to about .46 phr. of hexamethylene tetramine.

4. A resinous powder composition according to claim 3 wherein there is about 0.1 to 11 phr. of a flow control agent.

5. A resinous powder composition according to claim 4 wherein the flow control agent is predominantly $SiO_2$.

6. A resinous powder composition according to claim 5 wherein there is up to about 5% by weight of titanium dioxide.

7. A resinous powder composition according to claim 1 wherein the solid epoxy resins are premelted with about 3% to 5% by weight of a glycidyl ester of a saturated synthetic tertiary monocarboxylic acid having $C_9$, $C_{10}$ and $C_{11}$ chain length and at an epoxy equivalent weight of 240 to 250 and a viscosity at 25° C. of about 7 to 8 centipoises and is resolidified and regranulated before mixing with trimellitic anhydride and the amine activator to form said composition.

8. A resinous powder composition according to claim 7 wherein the solid epoxy resin is a mixture of which 80% to 90% by weight has an epoxy equivalent weight between about 825 to about 1025 and a Durran's melting point of about 93° to 105° C. and the remainder has an epoxy equivalent weight of about 1550 to about 2500 and a Durran's melting point of 113° to 135° C.

9. A resinous powder composition suitable for coating of conductors and the like which comprises a mixture of epoxy resins of which 80% to 90% by weight is a solid diglycidyl ether of 2,2-bis(4-hydroxyphenyl) propane having an epoxy equivalent weight between about 825 to about 1025 and a Durran's melting point between about 93° C. to about 105° C. and the remainder is a solid diglycidyl ether of 2,2-bis(4-hydroxyphenyl) propane having an epoxy equivalent weight between about 1550 to about 2500 and a Durran's melting point between about 113° C. to about 135° C., 8 to 12.5 phr. of trimellitic anhydride, from about .11 to about .46 phr. of hexamethylene tetramine, and from about 3% to 5% by weight, based on the weight of the composition, of a glycidyl ester of a saturated synthetic tertiary monocarboxylic acid having $C_9$, $C_{10}$ and $C_{11}$ chain length and a epoxy equivalent weight of 240 to 250 and a viscosity at 25° C. of about 7 to 8 centipoises; said glycidyl ester being premelted with said glycidyl ethers and the admixture resolidified and regranulated prior to mixing with the trimellitic anhydride and the hexamethylene tetramine.

10. A resinous powder composition according to claim 1 wherein the solid epoxy resins are premelted with 1 to 5% by weight of dibutylphthalate, dioctylphthalate or dibutylsebacate and are resolidified and regranulated before mixing with trimellitic anhydride and the amine activator to form said composition.

11. A resinous powder composition suitable for coating of conductors and the like which comprises a mixture of a first solid diglycidyl ether of 2,2-bis(4-hydroxyphenyl) propane having an epoxy equivalent weight between about 825 to about 1025 and a Durran's melting point between about 93° C. to about 105° C., a second solid diglycidyl ether of 2,2-bis(4-hydroxyphenyl) propane having an epoxy equivalent weight between about 1550 to about 2500 and a Durran's melting point of 113° C. to 135° C., 8 to 12.5 phr. of trimellitic anhydride, about .11 to about .46 phr. of hexamethylene tetramine, and from about 1% to 5% by weight, based on the weight of the composition, of dibutylphthalate, dioctylphthalate or dibutylsebacate premelted with said glycidyl ethers and the admixture resolidified and regranulated prior to mixing with the trimellitic anhydride and the hexamethylene tetramine.

12. A resinous powder composition according to claim 1 wherein 1% to 10% by weight of an accelerator is mixed therewith, said accelerator is glycerol tristrimellitate, having a softening point in the range of about 40 to 60° C. and a flow point of about 80° to 100° C.

13. A resinous powder composition according to claim 1 in which from 1% to about 21% by weight of a copolymer of styrene and allyl alcohol having on each molecule an average of about 5.4 primary hydroxyl groups and about 12.4 styrene monomer residues, is mixed therewith.

14. A resinous powder composition of claim 13 in which the epoxy resin is a mixture of which 80% to 90% by weight has an epoxy equivalent weight in the range between 825 and 1025 and a Durran's melting point between 93° and 105° C. and the remainder has an epoxy equivalent weight in the range between 1550 and 2500 and a Durran's melting point between 113° and 135° C.

15. A resinous powder composition suitable for coating of conductors and the like which comprises a mixture of epoxy resins of which 80% to 90% by weight is a solid diglycidyl ether of 2,2-bis(4-hydroxyphenyl) propane having an epoxy equivalent weight between about 825 to about 1025 and a Durran's melting point between about 93° C. to about 105° C. and the remainder is a solid diglycidyl ether of 2,2-bis(4-hydroxyphenyl) propane having an epoxy equivalent weight between about 1550 to about 2500 and a Durran's melting point between about 113° C. to about 135° C., 8 to 12.5 phr. of trimellitic anhydride, from about .11 to about .46 phr. of hexamethylene tetramine, and from 1% to about 21% by weight of a copolymer of styrene and allyl alcohol having on each molecule an average of about 5.4 primary hydroxyl groups and about 12.4 styrene monomer residues.

16. A resinous powder composition according to claim 15 wherein 0.1% to 11% by weight of a flow controlling agent which is predominantly $SiO_2$ is mixed therewith.

17. An insulated electrical conductor comprising a wire and a coating thereon having a thickness in the range between 1 to 5 mils, said coating being the fused and cured composition of claim 1.

18. An insulated electrical conductor according to claim 17 wherein the epoxy resin is a mixture of which 80% to 90% has an epoxy equivalent weight of about 825 to about 1025 and a Durran's melting point of about 93° to 105° C. and the remainder has an epoxy equivalent weight of about 1550 to about 2500 and a Durran's melting point of 113° to 135° C.

19. An insulated electrical conductor according to claim 18 wherein the activator is hexamethylene tetramine.

20. An insulated electrical conductor according to claim 19 wherein there is about 0.1 to 11 phr. of a flow control agent which is predominantly $SiO_2$.

21. An insulated electrical conductor according to claim 17 wherein the solid epoxy resins are premelted with about 3% to 5% by weight of a glycidyl ester of a saturated synthetic tertiary monocarboxylic acid having $C_9$, $C_{10}$ and $C_{11}$ chain length having an epoxy equivalent weight of 240 to 250 and a viscosity at 25° C. of about 7 to 8 centipoises and are resolidified and regranulated before mixing with trimellitic anhydride and the amine activator to form said composition.

22. An insulated electrical conductor according to claim 21 wherein the activator is hexamethylene tetramine.

23. An insulated electrical conductor according to claim 21 wherein the solid epoxy resins are premelted with 1 to 5% by weight of dibutylphthalate, dioctylphthalate or dibutylsebacate and are resolidified and regranulated before mixing with trimellitic anhydride and the activator to form said composition.

24. An insulated electrical conductor according to claim 23 wherein the activator is hexamethylene tetramine.

25. An insulated electrical conductor according to claim 21 wherein 1% to 10% by weight of an accelerator is mixed therewith, said accelerator is glycerol tristrimellitate, having a softening point in the range of about 40 to 60° C. and a flow point of about 80° to 100° C.

26. An insulated electrical conductor according to claim 21 in which from 1% to about 21% by weight of a copolymer of styrene and allyl alcohol having on each molecule an average of about 5.4 primary hydroxyl group and about 12.4 styrene monomer residues, is mixed therewith.

27. An insulated electrical conductor according to claim 26 in which the epoxy resin is a mixture of which 80% to 90% by weight has an epoxy equivalent weight in the range between 825 and 1025 and a Durran's melting point between 93° and 105° C. and the remainder has an epoxy equivalent weight in the range between 1550 and 2500 and a Durran's melting point between 113° and 135° C.

28. An insulated electrical conductor according to claim 27 wherein the activator is hexamethylene tetramine.

29. An insulated electrical conductor according to claim 28 wherein 0.1% to 11% by weight of a flow controlling agent which is predominantly $SiO_2$ is mixed therewith.

References Cited

UNITED STATES PATENTS

| | | | |
|---|---|---|---|
| 3,485,789 | 12/1969 | Guilbault | 260—37 X |
| 3,484,398 | 12/1969 | Childs | 260—47 X |
| 3,477,971 | 11/1969 | Allen et al. | 260—18 |
| 3,384,610 | 5/1968 | Lee | 260—37 |
| 3,374,193 | 3/1968 | Tsatsos | 260—18 |
| 3,269,974 | 8/1966 | Childs | 260—830 |
| 3,142,657 | 7/1964 | Fisch | 260—47 X |
| 3,546,017 | 12/1970 | Pendleton | 117—232 |
| 3,578,615 | 5/1971 | Moore | 260—37 X |
| 3,555,111 | 1/1971 | Benham | 260—830 |

FOREIGN PATENTS 1,193,250  5/1965  Germany.

OTHER REFERENCES

Handbook of Epoxy Resins; Lee and Neville; McGraw-Hill, New York, 1957; pp. 13-1 to 3, 13-6 to 11, 13-14-17 and 16-14 and 15.

DONALD E. CZAJA, Primary Examiner

C. W. IVY, Assistant Examiner

U.S. Cl. X.R.

117—128.4, digest 6; 260—31.8 e, 37 ep, 830 TW, 47 epc, 837